(12) United States Patent
Kajitani et al.

(10) Patent No.: US 8,964,285 B2
(45) Date of Patent: Feb. 24, 2015

(54) MICROSCOPE OPTICAL SYSTEM

(75) Inventors: Kazuo Kajitani, Tokyo (JP); Tatsuji Higuchi, Tokyo (JP)

(73) Assignee: Olympus Corporation, Tokyo (JP)

( * ) Notice: Subject to any disclaimer, the term of this patent is extended or adjusted under 35 U.S.C. 154(b) by 350 days.

(21) Appl. No.: 13/425,607

(22) Filed: Mar. 21, 2012

(65) Prior Publication Data

US 2012/0243078 A1 Sep. 27, 2012

(30) Foreign Application Priority Data

Mar. 23, 2011 (JP) .................................. 2011-064992
Oct. 14, 2011 (JP) .................................. 2011-227100

(51) Int. Cl.
*G02B 21/02* (2006.01)
*G02B 25/00* (2006.01)
G02B 21/20 (2006.01)

(52) U.S. Cl.
CPC .............. *G02B 21/02* (2013.01); *G02B 25/001* (2013.01); *G02B 21/20* (2013.01)
USPC ............................ 359/368; 359/432; 359/434

(58) Field of Classification Search
CPC .. G02B 21/248; G02B 7/102; G02B 21/0012; G02B 21/025; G02B 21/33; G02B 23/2438; G02B 21/02; G02B 21/16; G02B 21/361; G02B 5/126
USPC .......................................... 359/368, 432, 434
See application file for complete search history.

(56) References Cited

U.S. PATENT DOCUMENTS 7,643,209 B2 * 1/2010 Fukuyama .................... 359/381
7,880,963 B2 * 2/2011 Matsui .......................... 359/380
2001/0004301 A1 6/2001 Kodama et al.

FOREIGN PATENT DOCUMENTS

JP 3250739 B2 1/2002

OTHER PUBLICATIONS

European Search Report dated Jan. 2, 2013, issued in corresponding European Patent Application No. 12001936.9 (8 pages).
"General Optical Considerations"; Handbook of Optics. 1995, pp. 17.4-17.5 (Annex pp. 1-3).

* cited by examiner

*Primary Examiner* — Frank Font
(74) *Attorney, Agent, or Firm* — Westerman, Hattori, Daniels & Adrian, LLP

(57) ABSTRACT

Observation over a superwide field of view is possible with a short, lightweight, and inexpensive eyepiece optical system and a binocular barrel. A microscope optical system includes an objective optical system configured to collect light from a specimen; an imaging optical system configured to image the light coming from the specimen and collected by the objective optical system; and an eyepiece optical system configured to magnify the image of the specimen formed by the imaging optical system and form a virtual image in an eye of an observer, wherein the following conditional expressions are satisfied, $$M = Fntl/Fob \times 250/Fne \quad (1)$$

$$Fntl = Ftl \times Kt \quad (2)$$

$$Fne = Fe \times Kt \quad (3)$$

$$0.4 < kt < 0.95 \quad (4).$$

6 Claims, 9 Drawing Sheets

MICROSCOPE OPTICAL SYSTEM

TECHNICAL FIELD

This application is based on Japanese Patent Application No. 2011-227100 and Japanese Patent Application No. 2011-064992, the contents of which are incorporated herein by reference.

The present invention relates to a microscope optical system.

BACKGROUND ART

In the related art, there are known superwide-field-of-view eyepieces for microscopes (for example, refer to PTL 1).

Such eyepieces are superwide-field-of-view eyepieces with 10× magnification and a field number on the order of 26.5.

CITATION LIST

Patent Literature

{PTL 1}
Publication of Japanese Patent No. 3250739

SUMMARY OF INVENTION

Technical Problem

Disadvantages of the eyepiece described in PTL 1 are that the eyepiece is large because the lens diameter, the total length of the eyepiece, and the number of required lenses are large. To achieve a field number 26.5, the effective sectional area of a prism inside the binocular barrel connecting to the eyepiece, which is orthogonal to the optical axis, must have a diameter of 26.5 mm or large. Thus, a 30-mm square prism must be used, making the binocular barrel large, heavy, and expensive.

The present invention has been conceived in light of the circumstances described above, and an object thereof is to provide a microscope optical system that includes a short, lightweight, and inexpensive eyepiece optical system and binocular barrel and that is capable of observation over a superwide field of view.

Solution to Problem

To achieve the above-described object, the present invention provides the following solutions.

A first aspect of the present invention provides a microscope optical system including an objective optical system configured to collect light from a specimen; an imaging optical system configured to image the light coming from the specimen and collected by the objective optical system; and an eyepiece optical system configured to magnifies the image of the specimen formed by the imaging optical system and form a virtual image in an eye of an observer, wherein the following conditional expressions are satisfied, $$M = Fntl/Fob \times 250/Fne \quad (1)$$

$$Fntl = Ftl \times Kt \quad (2)$$

$$Fne = Fe \times Kt \quad (3)$$

$$0.4 < Kt < 0.95 \quad (4)$$

where M is the total magnification, Fntl is the focal length of the imaging optical system, Fob is the focal length of the objective optical system, Fne is the focal length of the eyepiece optical system, Ftl is the focal length of the reference imaging optical system with no magnification, Fe is the focal length of the eyepiece optical system in the microscope optical system including the reference imaging optical system and the objective optical system, and Kt is a coefficient.

According to the first aspect, the field number can be kept effectively unchanged by reducing the focal length of the eyepiece optical system and the focal length of the imaging optical system by the same percentage and increasing the magnification of the eyepiece optical system without changing the total magnification M, compared to a microscope optical system having a reference imaging optical system with no magnification and a reference eyepiece optical system.

To keep the field number effectively unchanged is equivalent to keeping the same view angle for the reference eyepiece optical system and the eyepiece optical system having a different magnification. Since the magnification of the imaging optical system is reduced, the primary image formed by the imaging optical system is diminished, and the diameter of the beam passing through the prism inside the binocular barrel is reduced. Hence, the size of the prism can be reduced, and the size of the binocular barrel can be reduced.

When $Kt \leq 0.4$, the focal length of the imaging optical system is too short. Thus, a sufficient air-conversion optical path length cannot be set forward of the left and right branching at the binocular barrel, making a satisfactory design difficult. When $Kt \geq 0.95$, the size of the prism cannot be effectively reduced.

A second aspect of the present invention provides a microscope optical system including an objective optical system configured to collect light from a specimen; an imaging optical system configured to image the light coming from the specimen and collected by the objective optical system; and an eyepiece optical system configured to magnify the image of the specimen formed by the imaging optical system and form a virtual image in an eye of an observer, wherein the following conditional expressions are satisfied, $$M = Ftl/Fnob \times 250/Fne \quad (5)$$

$$Fnob = Fob \times Ko \quad (6)$$

$$Fne = Fe/Ko \quad (7)$$

$$1.1 < Ko < 2.6 \quad (8)$$

where M is the total magnification, Ftl is the focal length of a imaging optical system, Fnob is the focal length of the objective optical system, Fne is the focal length of the eyepiece optical system, Fob is the focal length of the objective optical system in the microscope optical system including the reference imaging optical system with no magnification and the reference eyepiece optical system with 10× magnification, Fe is the focal length of the reference eyepiece optical system, and Ko is a coefficient.

According to the second aspect, the focal length of the objective optical system is increased, and the focal length of the eyepiece optical system is reduced, compared to a microscope optical system including a reference imaging optical system with no magnification and a reference eyepiece optical system with 10× magnification. By changing the focal lengths by the same percentage, the magnification of the eyepiece optical system can be increased without changing the total magnification, and the field number can be effectively increased. To effectively increase the field number is to achieve a view angle larger than that of the reference optical system.

By reducing the magnification of the objective optical system, a wide range is diminished and projected if the field number of the primary image is unchanged. Thus, observation is possible by enlarging the image diminished by the objective optical system with the eyepiece optical system having increased magnification. That is, the field number can be effectively increased without changing the field number of the primary image, i.e., without increasing the size of the prism in the binocular barrel.

A third aspect of the present invention provides a microscope optical system including an objective optical system configured to collect light from a specimen; an imaging optical system configured to image the light coming from the specimen and collected by the objective optical system; and an eyepiece optical system configured to magnify the image of the specimen formed by the imaging optical system and form a virtual image in an eye of an observer, wherein the following conditional expressions are satisfied, $$M = Fntl/Fnob \times 250/Fne \quad (9)$$

$$Fntl = Ftl \times Kt \quad (10)$$

$$Fnob = Fob \times Ko \quad (11)$$

$$Fne = Fe \times (Kt/Ko) \quad (12)$$

$$0.4 < Kt < 0.95 \quad (13)$$

$$1.1 < Ko < 2.6 \quad (14)$$

where M is the total magnification, Fntl is the focal length of the imaging optical system, Fnob is the focal length of the objective optical system, Fne is the focal length of the eyepiece optical system, Ftl is the focal length of the reference imaging optical system with no magnification, Fob is focal length of the reference objective optical system in the microscope optical system including the reference imaging optical system with no magnification and the reference eyepiece optical system with 10× magnification, Fe is the focal length of the reference eyepiece optical system, and Kt and Ko are coefficients.

In the first aspect described above, it is preferable that the microscope optical system satisfy the following conditional expressions:

$$10 < FN < 23 \quad (15)$$

$$0.65 < Kt < 0.85 \quad (16)$$

where FN represents the field number of the eyepiece optical system.

In the second aspect described above, it is preferable that the objective optical system satisfy the following conditional expressions:

$$0.45 < FN/(2 \times Fne) < 1.4 \quad (17)$$

$$1.5 < Ko < 2.2 \quad (18)$$

where FN represents the field number of the eyepiece optical system.

A fourth aspect of the present invention provides a microscope optical system including an objective optical system configured to collect light from a specimen; a reference imaging optical system with no magnification configured to converge the light coming from the specimen and collected by the objective optical system and form a primary image; an eyepiece optical system configured to magnify the primary image of the specimen formed by the reference imaging optical system and form a virtual image in an eye of an observer; and an intermediate lens system disposed between the objective optical system and the primary image and including, in order from the objective optical system side, a negative-power first group and a positive-power second group, wherein the following conditional expressions are satisfied, $$M = Ftl/Fob \times q \times 250/Fne \quad (19)$$

$$Fne = Fe \times q \quad (20)$$

$$0.55 < q < 0.95 \quad (21)$$

where M is the total magnification, Ftl is the focal length of the reference imaging optical system, Fne is the focal length of the eyepiece optical system, Fob is the focal length of the objective optical system in the microscope optical system including the reference imaging optical system and the reference eyepiece optical system with 10× magnification, Fe is the focal length of the reference eyepiece optical system, and q is a magnification conversion coefficient of a barrel magnification coefficient of the primary image formed by the intermediate lens system.

Since an intermediate lens system having a magnification conversion function is provided in this way, the effective magnification of the objective lens is reduced, diminishing the primary image. As a result, the size of the prism in the binocular barrel can be reduced. In such a case, when q is 0.55 or smaller, optical vignetting is more likely to occur because the height of the beam emitted from an intermediate barrel increases and exceeds the effective diameter of the reference imaging optical system. When q is 0.95 or larger, the primary image is not effective in practice.

Advantageous Effects of Invention

The present invention is advantageous in that super-wide view observation is possible with a short, light, and inexpensive eyepiece optical system and a binocular barrel.

BRIEF DESCRIPTION OF DRAWINGS

FIG. 1(a) illustrates a microscope optical system according to a first embodiment of the present invention, and FIG. 1(b) illustrates a known microscope optical system.

FIG. 2(a) illustrates a microscope optical system according to a second embodiment of the present invention, and FIG. 2(b) illustrates a known microscope optical system.

FIG. 3 illustrates a lens configuration according to an example of the microscope optical system illustrated in FIG. 1.

FIG. 4 is an aberration diagram of the microscope optical system illustrated in FIG. 3.

FIG. 5 illustrates a lens configuration according to an example of the microscope optical system illustrated in FIG. 2.

FIG. 6 is an aberration diagram of the microscope optical system illustrated in FIG. 5.

FIG. 7 illustrates a microscope optical system according to a third embodiment of the present invention.

FIG. 8 illustrates a lens configuration according to an example of the microscope optical system illustrated in FIG. 7.

FIG. 9 is an aberration diagram of the microscope optical system illustrated in FIG. 8.

DESCRIPTION OF EMBODIMENTS

A microscope optical system 1 according to a first embodiment of the present invention will be described below with reference to the drawings.

As illustrated in FIG. 1(a), the microscope optical system 1 according to this embodiment includes an objective optical system 2 that collects light from a specimen A, an imaging optical system 3 that images the light coming from the specimen A and collected by the objective optical system 2, and an eyepiece optical system 4 that magnifies the image of the specimen A formed by the imaging optical system 3 to form a virtual image B at a viewing angle 2ω at an eye E of an observer.

FIG. 1(b) illustrates, as a reference example, a microscope optical system 1' including a reference imaging optical system 3' with no magnification.

Figure 1:
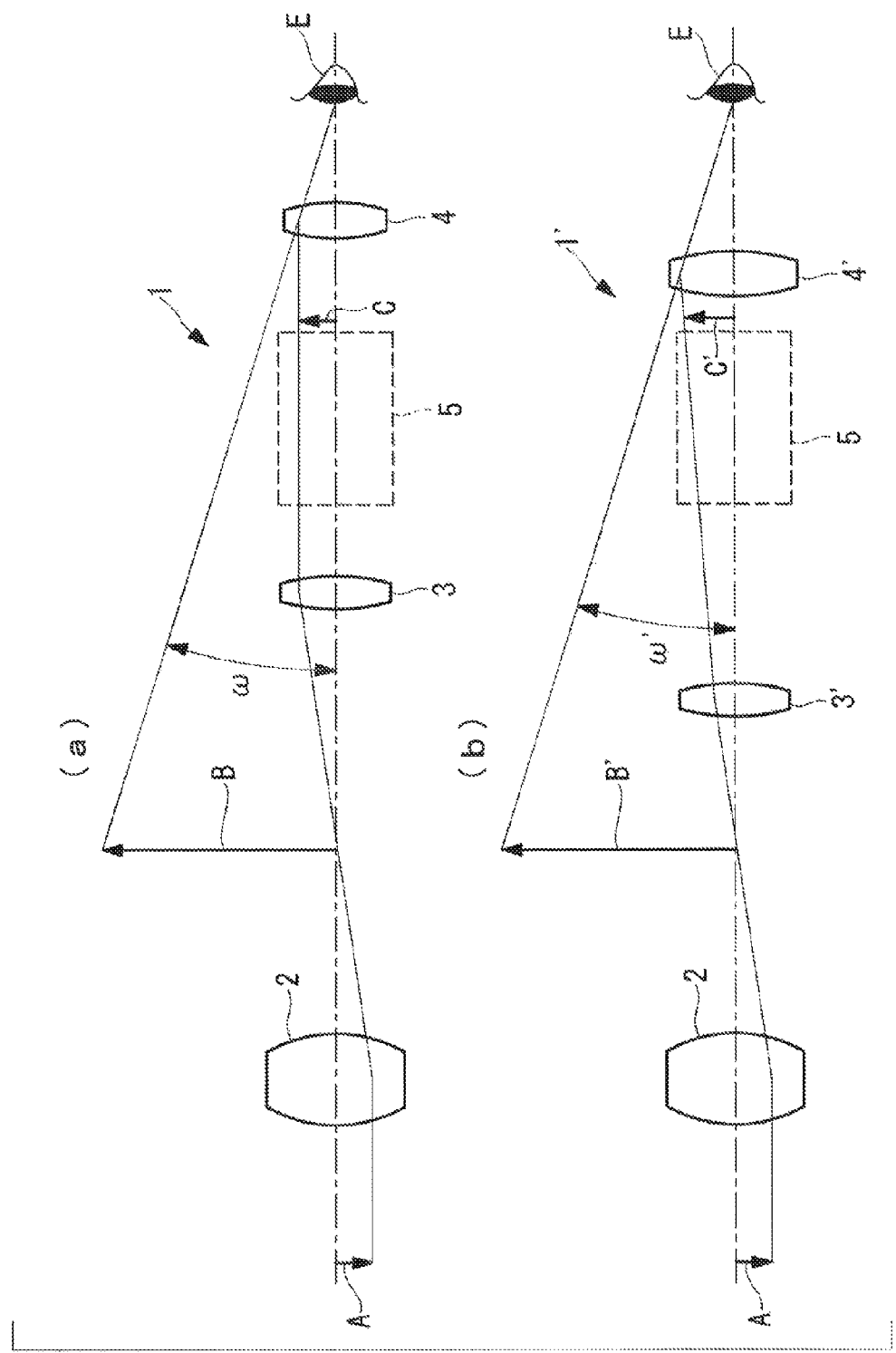
{FIG. 1}

A binocular barrel 5 splits the light that has been converged by the imaging optical system 3 into two beams and then guides the beams to the eyepiece optical system 4. In FIG. 1, the objective optical system 2, the imaging optical system 3, and the eyepiece optical system 4 are illustrated as simple lenses, but actually these optical systems each contain a plurality of lenses.

$$M = Fntl/Fob \times 250/Fne \quad (1)$$

$$Fntl = Ftl \times Kt \quad (2)$$

$$Fne = Fe \times Kt \quad (3)$$

$$0.4 < Kt < 0.95 \quad (4)$$

Here M is the total magnification, Fntl is the focal length of the imaging optical system 3, Fob is the focal length of the objective optical system 2, Fne is the focal length of the eyepiece optical system 4, Ftl is the focal length of the reference imaging optical system 3' with no magnification, Fe is the focal length of the reference eyepiece optical system 4' of the microscope optical system 1', which includes the reference imaging optical system 3' and the objective optical system 2, and Kt is a coefficient.

In the microscope optical system 1 according to this embodiment having such a configuration, when the light coming from the specimen A is collected by the objective optical system 2 and enters the imaging optical system 3 as a substantially collimated beam, the beam forms an intermediate image C by being converged by the imaging optical system 3 and then enters the eyepiece optical system 4.

In such a case, the focal length Fne of the eyepiece optical system 4 of the microscope optical system 1 according to this embodiment is shorter than that in the microscope optical system 1', which includes the reference imaging optical system 3' with no magnification. Since the magnification of the eyepiece optical system 4 increases as a result, the field number can be effectively increased while decreasing the total length of the eyepiece optical system 4.

At the same time, the focal length Fntl of the imaging optical system 3 of the microscope optical system 1 according to this embodiment is smaller than that of the reference imaging optical system 3'. Thus, the magnification of the imaging optical system 3 is reduced, and the size of the primary image formed by the imaging optical system 3 decreases. Hence, the diameter of the beam passing through the binocular barrel 5 can be reduced. As a result, this is advantageous in that the size of the prism inside the binocular barrel 5 can be reduced, and the size of the binocular barrel 5 can be reduced.

In the microscope optical system 1 according to this embodiment, the focal length Fne of the eyepiece optical system 4 and the focal length Fntl of the imaging optical system 3 are reduced by the same ratio. In this way, the total magnification does not change. Although the image height of the intermediate image C is Kt times the image height of the intermediate image C', the image heights of the virtual images B and B' viewed by the eye (E) are the same, and the field numbers can be kept effectively unchanged. Keeping the field numbers effectively unchanged means that the viewing angle 2ω' of the reference eyepiece optical system 4' is the same as the viewing angle 2ω of the eyepiece optical system 4.

Furthermore, it is preferable that the following conditional expressions be satisfied:

$$10 < FN < 23 \quad (15)$$

$$0.65 < Kt < 0.85 \quad (16)$$

where FN represents the field number of the eyepiece optical system 4, which is equal to the diameter of the intermediate image C.

It is, for example, most preferable that Kt=0.8.

When Kt≤0.4, the focal length Fntl of the imaging optical system 3 is too small. Hence, a sufficient air-equivalent optical path length cannot be ensured in front of the left and right branching at the binocular barrel 5, making the design process difficult. When Kt≥0.95, the size of the prism inside the binocular barrel 5 cannot actually be reduced. Thus, it is preferable that Conditional Expression 4 be satisfied.

Table 1 lists the nominal magnification and the focal length Fob of the objective optical system 2, the focal length Ftl of the reference imaging optical system 3', the focal length Fntl of the imaging optical system 3, the effective magnification of the objective optical system 2, the magnification and the focal length Fne of the eyepiece optical system 4, and the total magnification M, for the microscope optical system 1 when Kt=0.8.

TABLE 1

| OBJECTIVE OPTICAL SYSTEM NOMINAL MAGNIFICATION | Fob | REFERENCE IMAGING OPTICAL SYSTEM Ftl | Ftnl | IMAGING OPTICAL SYSTEM EFFECTIVE MAGNIFICATION | EYEPIECE OPTICAL SYSTEM MAGNIFICATION | Fne | TOTAL MAGNIFICATION M |
|---|---|---|---|---|---|---|---|
| 4 | 41.1 | 164.5 | 131.6 | 3.2 | 12.5 | 20 | 40 |
| 10 | 16.5 | | | 8 | | | 100 |
| 20 | 8.2 | | | 16 | | | 200 |
| 40 | 4.1 | | | 32 | | | 400 |
| 60 | 2.7 | | | 48 | | | 600 |
| 100 | 1.6 | | | 80 | | | 1000 |
| 4 | 45 | 180 | 144 | 3.2 | | | 40 |
| 10 | 18 | | | 8 | | | 100 |
| 20 | 9 | | | 16 | | | 200 |
| 40 | 4.5 | | | 32 | | | 400 |
| 60 | 3 | | | 48 | | | 600 |
| 100 | 1.8 | | | 80 | | | 1000 |
| 4 | 50 | 200 | 160 | 3.2 | | | 40 |
| 10 | 20 | | | 8 | | | 100 |
| 20 | 10 | | | 16 | | | 200 |
| 40 | 5 | | | 32 | | | 400 |
| 60 | 3.3 | | | 48 | | | 600 |
| 100 | 2 | | | 80 | | | 1000 |

Next, a microscope optical system 10 according to a second embodiment of the present invention will be described below with reference to the drawings.

The components in the microscope optical system 10 according to this embodiment that are the same as those in the microscope optical system 1 according to the first embodiment are represented by the same reference numerals, and the descriptions thereof are omitted.

Figure 2:
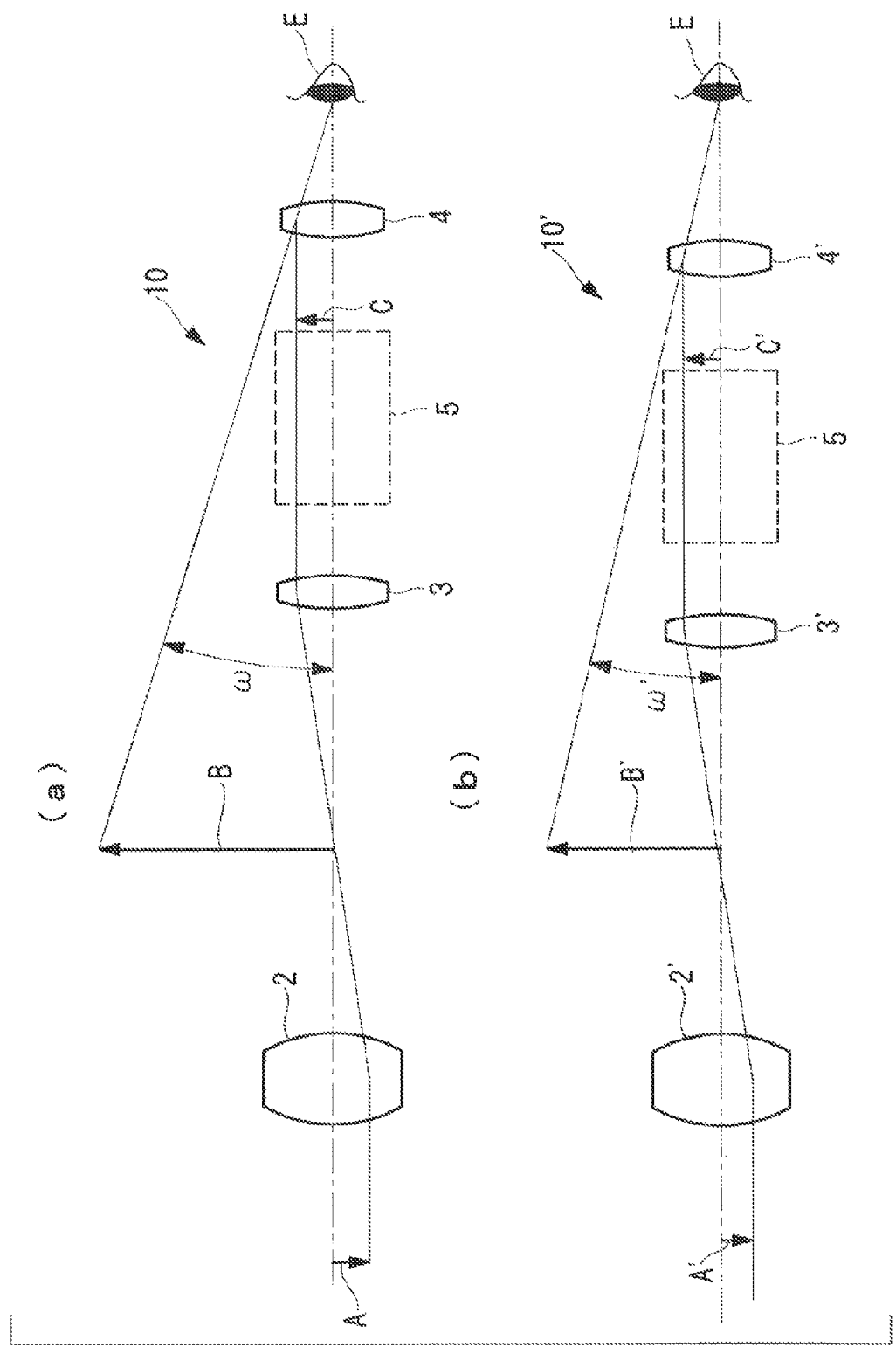
{FIG. 2}

As illustrated in FIG. 2(a), the microscope optical system 10 according to this embodiment also includes an objective optical system 2, an imaging optical system 3, and an eyepiece optical system 4.

FIG. 2(b) illustrates, as a reference example, a microscope optical system 10' including a reference imaging optical system 3' with no magnification and a reference eyepiece optical system 4' with a 10× magnification.

The microscope optical system 10 according to this embodiment satisfies the following conditional expressions:

$$M = Ftl/Fnob \times 250/Fne \quad (5)$$

$$Fnob = Fob \times Ko \quad (6)$$

$$Fne = Fe/Ko \quad (7)$$

$$1.1 < Ko < 2.6 \quad (8)$$

where M is the total magnification, Fnob is the focal length of the objective optical system 2, Fob is the focal length of the objective optical system 2 in the microscope optical system 10' including the reference imaging optical system 3' with no magnification and the reference eyepiece optical system 4' with a 10× magnification, Fe is the focal length of the reference eyepiece optical system 4', and Ko is a coefficient.

In the microscope optical system 10 according to this embodiment, having such a configuration, the focal length Fne of the eyepiece optical system 4 is smaller than that of the reference eyepiece optical system 4'. As a result, the magnification of the eyepiece optical system 4 increases, and thus, the field number can be effectively increased while decreasing the total length of the eyepiece optical system 4. To effectively increase the field number means to achieve an angle of view larger than that of the reference eyepiece optical system.

At the same time, the focal length Fnob of the objective optical system 2 in the microscope optical system 10 according to this embodiment is Ko times larger than that of the microscope optical system 10' including the reference imaging optical system 3' and the reference eyepiece optical system 4'. In this way, the magnification of the objective optical system 2 is reduced, and a wider area can be projected in a reduced fashion if the field number of a primary image C is unchanged. Observation is possible by enlarging the image reduced by the objective optical system 2 with the eyepiece optical system 4 having higher magnification.

At this time, by setting the same percentage change for both focal lengths, the total magnification is not changed, and the magnification of the eyepiece optical system 4 is increased to effectively increase the field number. That is, the field number can be effectively increased without changing the field number of the primary image, i.e., without increasing the size of the prism in the binocular barrel 5. To effectively increase the field number means to achieve a viewing angle 2ω of the eyepiece optical system 4 that is larger than the viewing angle 2ω' of the reference eyepiece optical system 4'.

Table 2 lists the nominal magnification and the focal length Fob of the reference objective optical system 2', the focal length Fnob of the objective optical system 2, the focal length Ftl of the reference imaging optical system 3', the effective magnification of the objective optical system 2, the magnification and the focal length Fne of the eyepiece optical system 4, and the total magnification M, for the microscope optical system 10 when Ko=2.

TABLE 2

| REFERENCE OBJECTIVE OPTICAL SYSTEM NOMINAL MAGNIFICATION | OBJECTIVE OPTICAL SYSTEM Fob | Fnob | Ftl | REFERENCE IMAGING OPTICAL SYSTEM EFFECTIVE MAGNIFICATION | EYEPIECE OPTICAL SYSTEM MAGNIFICATION | Fne | TOTAL MAGNIFICATION M |
|---|---|---|---|---|---|---|---|
| 4 | 41.1 | 82.3 | 164.5 | 2 | 20 | 12.5 | 40 |
| 10 | 16.5 | 32.9 | | 5 | | | 100 |
| 20 | 8.2 | 16.5 | | 10 | | | 200 |
| 40 | 4.1 | 8.2 | | 20 | | | 400 |
| 60 | 2.7 | 5.5 | | 30 | | | 600 |
| 100 | 1.6 | 3.3 | | 50 | | | 1000 |
| 4 | 45 | 90 | 180 | 2 | | | 40 |
| 10 | 18 | 36 | | 5 | | | 100 |
| 20 | 9 | 18 | | 10 | | | 200 |
| 40 | 4.5 | 9 | | 20 | | | 400 |
| 60 | 3 | 6 | | 30 | | | 600 |
| 100 | 1.8 | 3.6 | | 50 | | | 1000 |
| 4 | 50 | 100 | 200 | 2 | | | 40 |
| 10 | 20 | 40 | | 5 | | | 100 |
| 20 | 10 | 20 | | 10 | | | 200 |
| 40 | 5 | 10 | | 20 | | | 400 |
| 60 | 3.3 | 6.7 | | 30 | | | 600 |
| 100 | 2 | 4 | | 50 | | | 1000 |

In this embodiment, it is even more preferable that the following conditional expressions be satisfied:

$$0.45 < FN/(2 \times Fne) < 1.4 \quad (17)$$

$$1.5 < Ko < 2.2 \quad (18)$$

In the above-described embodiments, the focal lengths of the imaging optical system 3 and eyepiece optical system 4 or the focal lengths of the objective optical system 2 and eyepiece optical system 4 are changed by the same percentage. Instead, however, the focal lengths of the objective optical system 2, the imaging optical system 3, and eyepiece optical system 4 may be set to satisfy the following conditional expressions.

$$M = Fntl/Fnob \times 250/Fne \quad (9)$$

$$Fntl = Ftl \times Kt \quad (10)$$

$$Fnob = Fob \times Ko \quad (11)$$

$$Fne = Fe \times (Kt/Ko) \quad (12)$$

$$0.4 < Kt < 0.95 \quad (13)$$

$$1.1 < Ko < 2.6 \quad (14)$$

Here M is the total magnification, Fntl is the focal length of the imaging optical system 3, Fnob is the focal length of the objective optical system 2, Fne is the focal length of the eyepiece optical system 4, Ftl is the focal length of the reference imaging optical system 3' with no magnification, Fob is the focal length of the reference objective optical system 2' in the microscope optical system 1' having the reference imaging optical system 3' with no magnification and the reference eyepiece optical system 4' with 10× magnification, Fe is the focal length of the reference eyepiece optical system 4', and Kt and Ko are coefficients.

Variable-inclination-angle lens barrels and lens barrels that have a lower eye point for the eyepiece may include a relay system in the imaging optical system because an increased optical path is required for installing a mechanism. In such a case, presuming that the optical system disposed between the objective optical system and the eyepiece optical system is an imaging optical system, the present invention can be applied thereto.

Next, a microscope optical system 20 according to a third embodiment of the present invention will be described below with reference to the drawings.

Components in the microscope optical system 20 according to this embodiment that are the same as those in the microscope optical system 1 according to the first embodiment are represented by the same reference numerals, and descriptions thereof are omitted.

Figure 7:
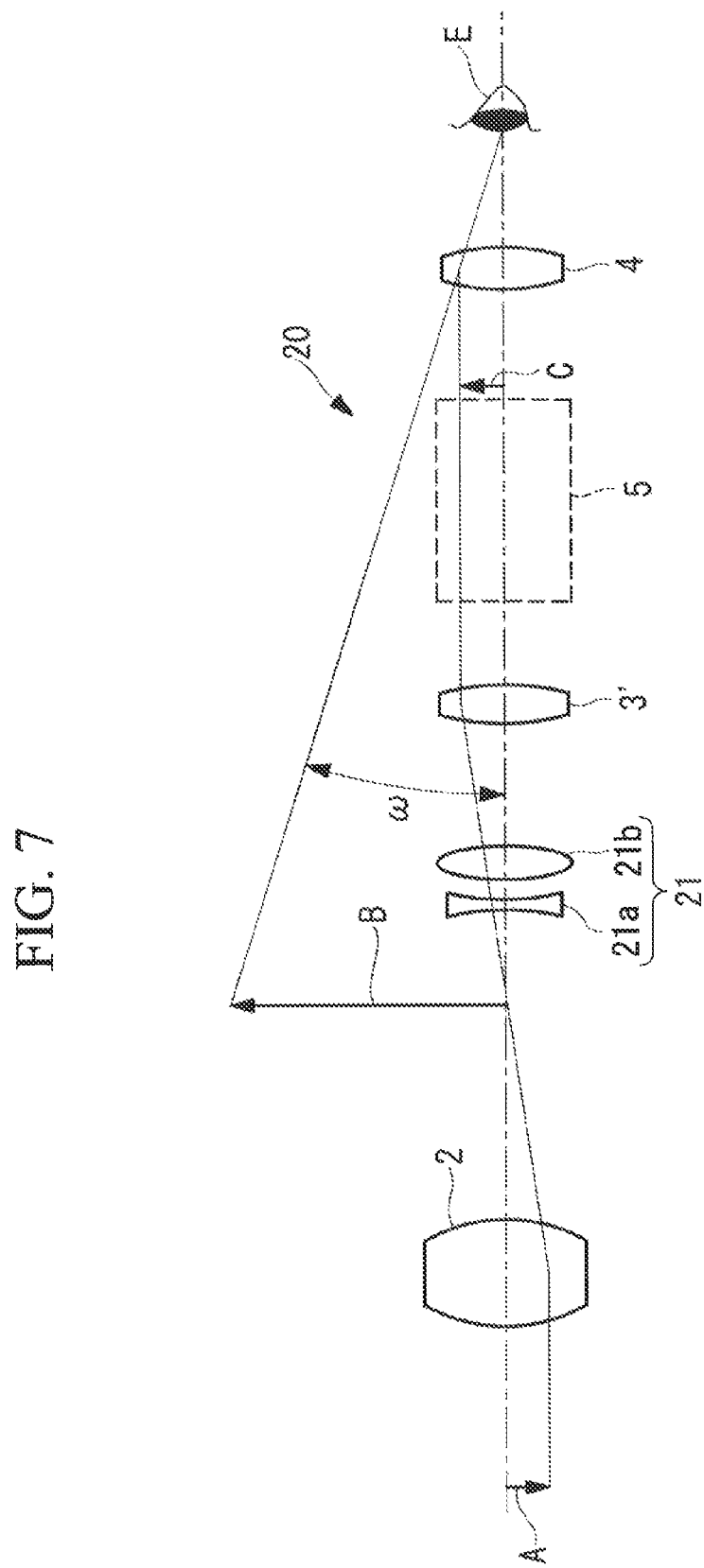
{FIG. 7}

As illustrated in FIG. 7, the microscope optical system 20 according to this embodiment includes an objective optical system 2, a reference imaging optical system 3', an eyepiece optical system 4, and an intermediate lens system 21 disposed between the objective optical system and a primary image C of the reference imaging optical system 3'.

The intermediate lens system 21 includes a negative-power first group 21a and a positive-power second group 21b, in this order from the objective optical system 2 side.

The microscope optical system 20 according to this embodiment also satisfies the following conditional expressions:

$$M = Ftl/Fob \times q \times 250/Fne \quad (19)$$

$$Fne = Fe \times q \quad (20)$$

$$0.55 < q < 0.95 \quad (21)$$

where M is the total magnification, Ftl is the focal length of the reference imaging optical system 3', Fne is the focal length of the eyepiece optical system 4, Fob is the focal length of the objective optical system 2 in the microscope optical system including the reference imaging optical system 3' and the reference eyepiece optical system 4' having 10× magnification, Fe represents the focal length of the reference eyepiece optical system 4', and q represents a magnification conversion coefficient for a barrel magnification coefficient of the primary image C formed by the intermediate lens system 21, where the barrel magnification coefficient is a coefficient for converting the lateral magnification of the primary image C due to the intermediate lens system 21 interposed between the objective optical system 2 and the primary image C.

In the microscope optical system 20 according to this embodiment, having such a configuration, the focal length Fne of the eyepiece optical system 4 is smaller than that of the reference eyepiece optical system 4'. As a result, similar to the microscope optical system 1 according to the first embodiment, the magnification of the eyepiece optical system 4 increases, and thus, the field number can be effectively increased while reducing the total length of the eyepiece optical system 4.

In this case, the microscope optical system 20 according to this embodiment includes the reference imaging optical system 3' with no magnification, and the conversion coefficient q of the intermediate lens system 21 is set to a value smaller than one. In this way, the primary image C formed by the intermediate lens system 21 and the reference imaging optical system 3' is diminished. As a result, the beam diameter of light passing through the binocular barrel 5 can be reduced. This is advantageous in that the size of the prism in the binocular barrel 5 can be reduced, and the size of the binocular barrel 5 can be reduced.

In the microscope optical system 20 according to this embodiment, the focal length Fne of the eyepiece optical system 4 and the combined focal length of the intermediate lens system 21 and the reference imaging optical system 3' are reduced by the same percentage. In this way, the total magnification does not change. Although the image height of the primary image C is q times the image height of the intermediate image C' in FIG. 2(b), the image heights of the virtual images B and B' viewed by the eye (E) are the same, and the field numbers can be kept effectively unchanged.

Table 3 lists the nominal magnification and the focal length Fob of the objective optical system 2, the focal length Ftl of the reference imaging optical system 3', the conversion coefficient q, the effective magnification of the imaging optical system 3, the magnification and the focal length Fne of the eyepiece optical system 4, and the total magnification M, for the microscope optical system 20 when q=0.63.

EXAMPLES

First Example

Next, examples of the microscope optical system 1 according to the first embodiment of the present invention will be described below.

Figure 3:
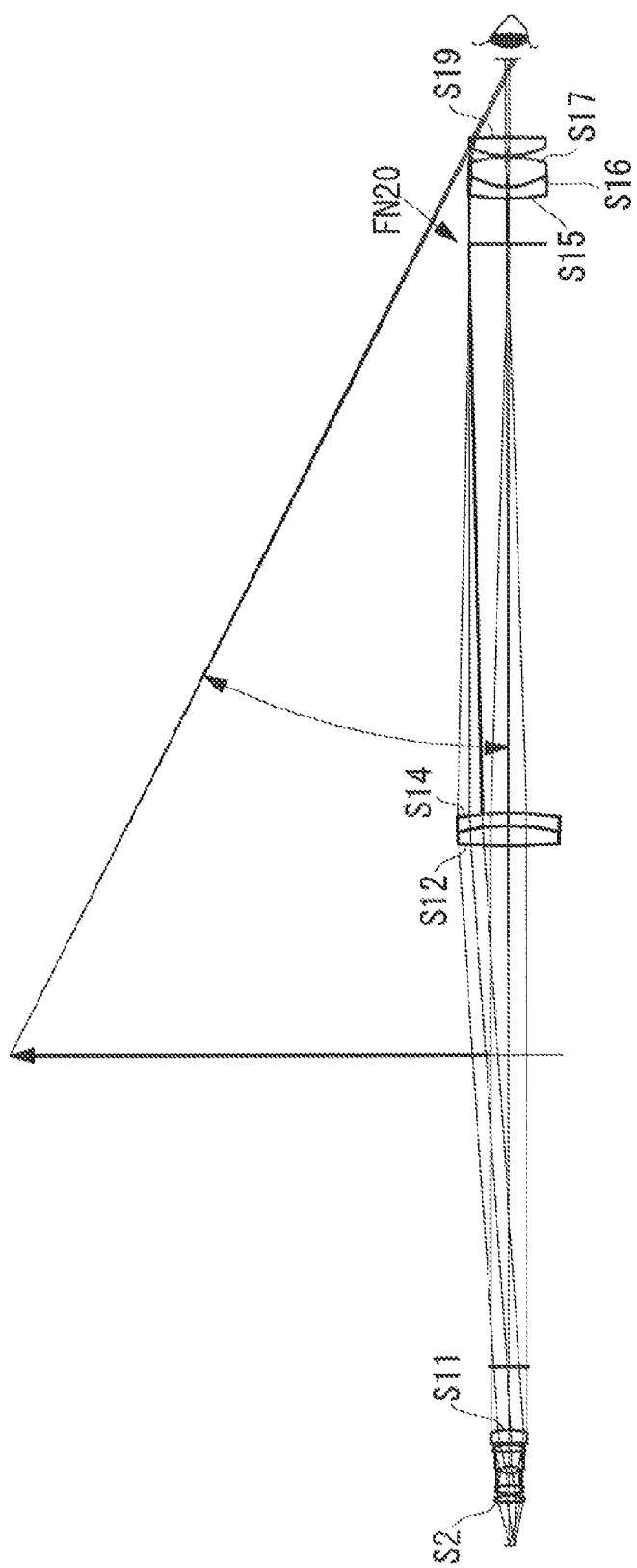
{FIG. 3}
Figure 4:
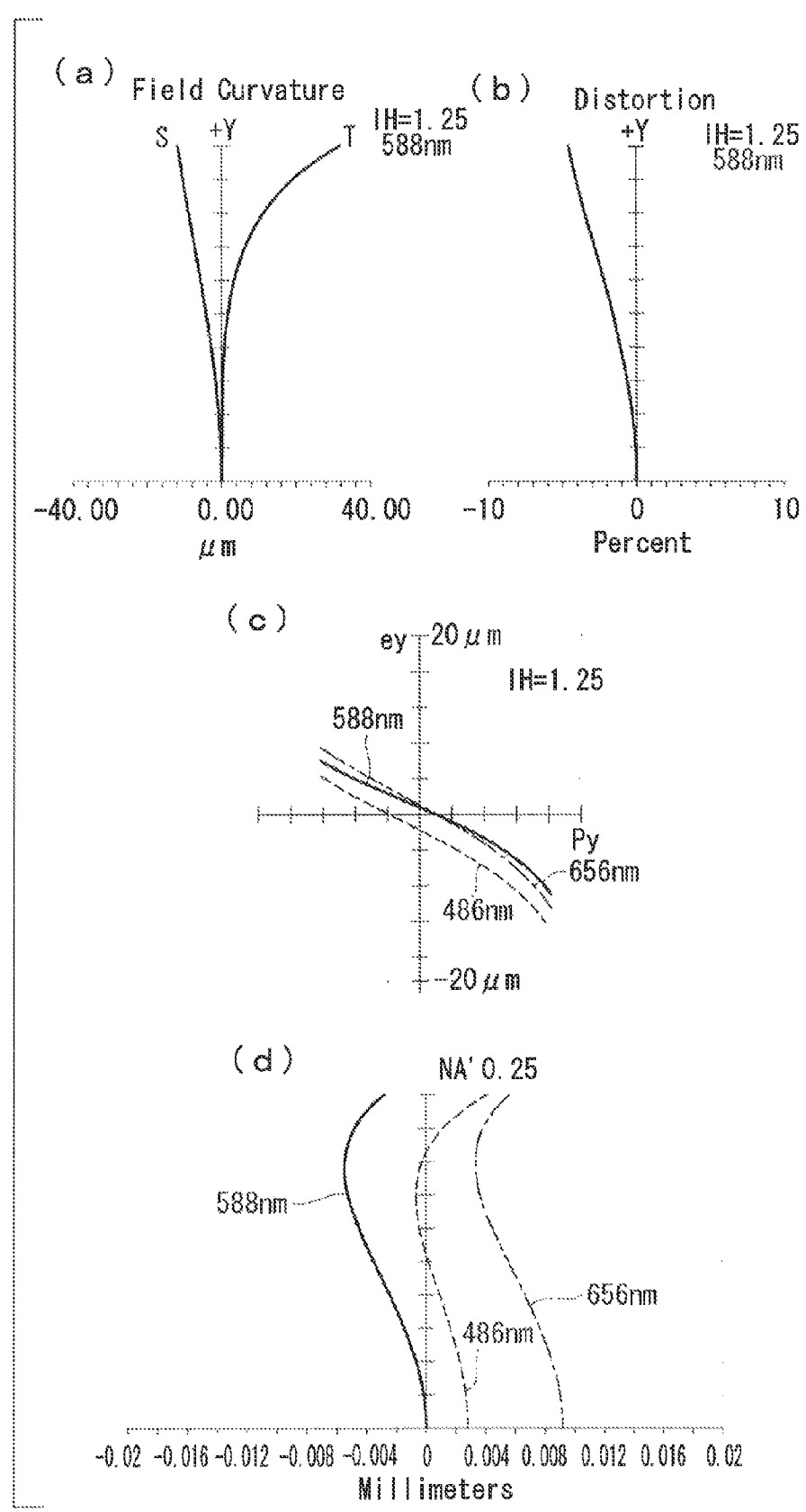
{FIG. 4}

FIG. 3 illustrates the lens layout of the microscope optical system 1 according to this example, Table 4 lists the lens data thereof, and FIG. 4 is an aberration diagram. In FIG. 3, only some surface numbers are illustrated, and the others are omitted.

FIG. 4(a) illustrates field curvature (astigmatic difference), FIG. 4(b) illustrates distortion, FIG. 4(c) illustrates off-axis lateral aberration (comatic aberration and magnification chromatic aberration), and FIG. 4(d) illustrates spherical aberration. The aberrations are measured at the object surface by reverse tracing.

TABLE 4

| SURFACE NUMBER | CURVATURE RADIUS | SPACING | REFRACTURE INDEX | ABBE NUMBER |
|---|---|---|---|---|
| OBJECT SURFACE | ∞ | 0.17 (cover glass) | 1.521 | 56 |
| 1 (OBJECTIVE OPTICAL SYSTEM 2) | ∞ | 10.64 (WD) | | |
| 2 | 24.36 | 1.82 | 1.7725 | 49.6 |
| 3 | −12.92 | 0.38 | | |
| 4 | 8.11 | 2.23 | 1.618 | 63.3 |
| 5 | −10.61 | 2.97 | 1.7185 | 33.5 |
| 6 | 5.36 | 1.89 | | |
| 7 | −4.33 | 3.53 | 1.6765 | 37.5 |
| 8 | ∞ | 1.93 | 1.497 | 81.5 |
| 9 | −8.19 | 0.33 | | |
| 10 | ∞ | 3.32 | 1.6393 | 44.9 |
| 11 (IMAGING OPTICAL | −12.7 | | | |

TABLE 3

| OBJECTIVE OPTICAL SYSTEM NOMINAL MAGNIFICATION | | REFERENCE IMAGING OPTICAL SYSTEM Ftl | INTERMEDIATE BARREL MAGNIFICATION INDEX q | IMAGING OPTICAL SYSTEM EFFECTIVE MAGNIFICATION | EYEPIECE OPTICAL SYSTEM MAGNIFICATION | Fne | TOTAL MAGNIFICATION M |
|---|---|---|---|---|---|---|---|
| | Fob | | | | | | |
| 4 | 41.1 | 164.5 | 0.63 | 2.52 | 15.9 | 15.75 | 40 |
| 10 | 16.5 | | | 6.3 | | | 100 |
| 20 | 8.2 | | | 12.6 | | | 200 |
| 40 | 4.1 | | | 25.2 | | | 400 |
| 60 | 2.7 | | | 37.8 | | | 600 |
| 100 | 1.6 | | | 63 | | | 1000 |
| 4 | 45 | 180 | | 2.52 | | | 40 |
| 10 | 18 | | | 6.3 | | | 100 |
| 20 | 9 | | | 12.6 | | | 200 |
| 40 | 4.5 | | | 25.2 | | | 400 |
| 60 | 3 | | | 37.8 | | | 600 |
| 100 | 1.8 | | | 63 | | | 1000 |
| 4 | 50 | 200 | | 2.52 | | | 40 |
| 10 | 20 | | | 6.3 | | | 100 |
| 20 | 10 | | | 12.6 | | | 200 |
| 40 | 5 | | | 25.2 | | | 400 |
| 60 | 3.3 | | | 37.8 | | | 600 |
| 100 | 2 | | | 63 | | | 1000 |

TABLE 4-continued

| SYSTEM 3) | | | | |
|---|---|---|---|---|
| 12 | 141.22 | 4.88 | 1.4875 | 70.2 |
| 13 | −51.38 | 3.2 | 1.7185 | 33.5 |
| 14 | −89.7 | | | |
| (EYEPIECE OPTICAL SYSTEM 4) | | | | |
| 15 | 57.29 | 2.85 | 1.8467 | 23.8 |
| 16 | 16.61 | 7.48 | 1.5163 | 64.1 |
| 17 | −30.77 | 0.16 | | |
| 18 | 20.27 | 4.84 | 1.7292 | 54.7 |
| 19 | −295.02 | | | |

Kt = 0.8
Fob = 18
Fntl = 144
Fne = 20
FN = 20
ω = 26.5°
M = 100

Second Example

Next, an example of the microscope optical system 10 according to the second embodiment of the present invention will be described below.

Figure 5:
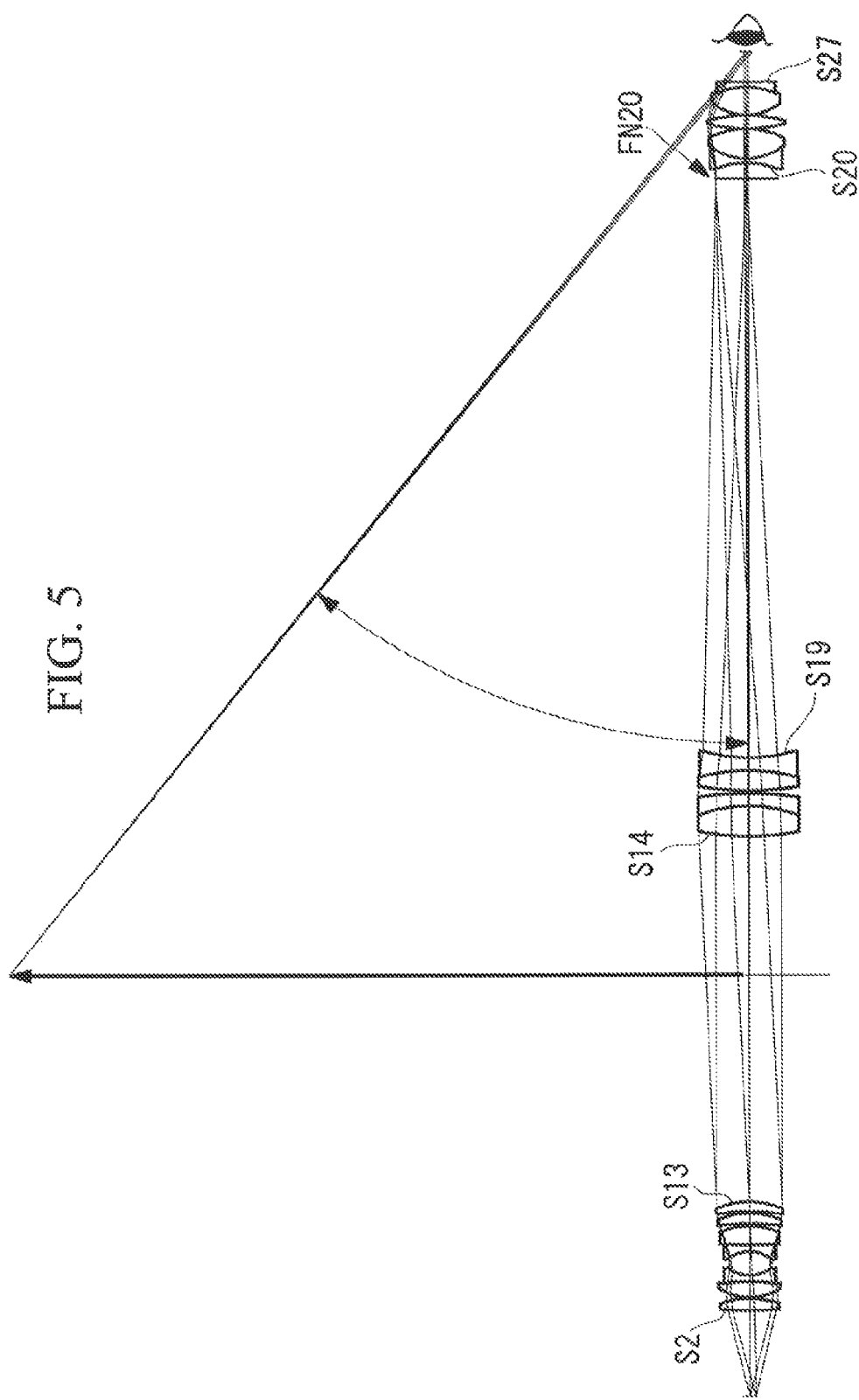
{FIG. 5}
Figure 6:
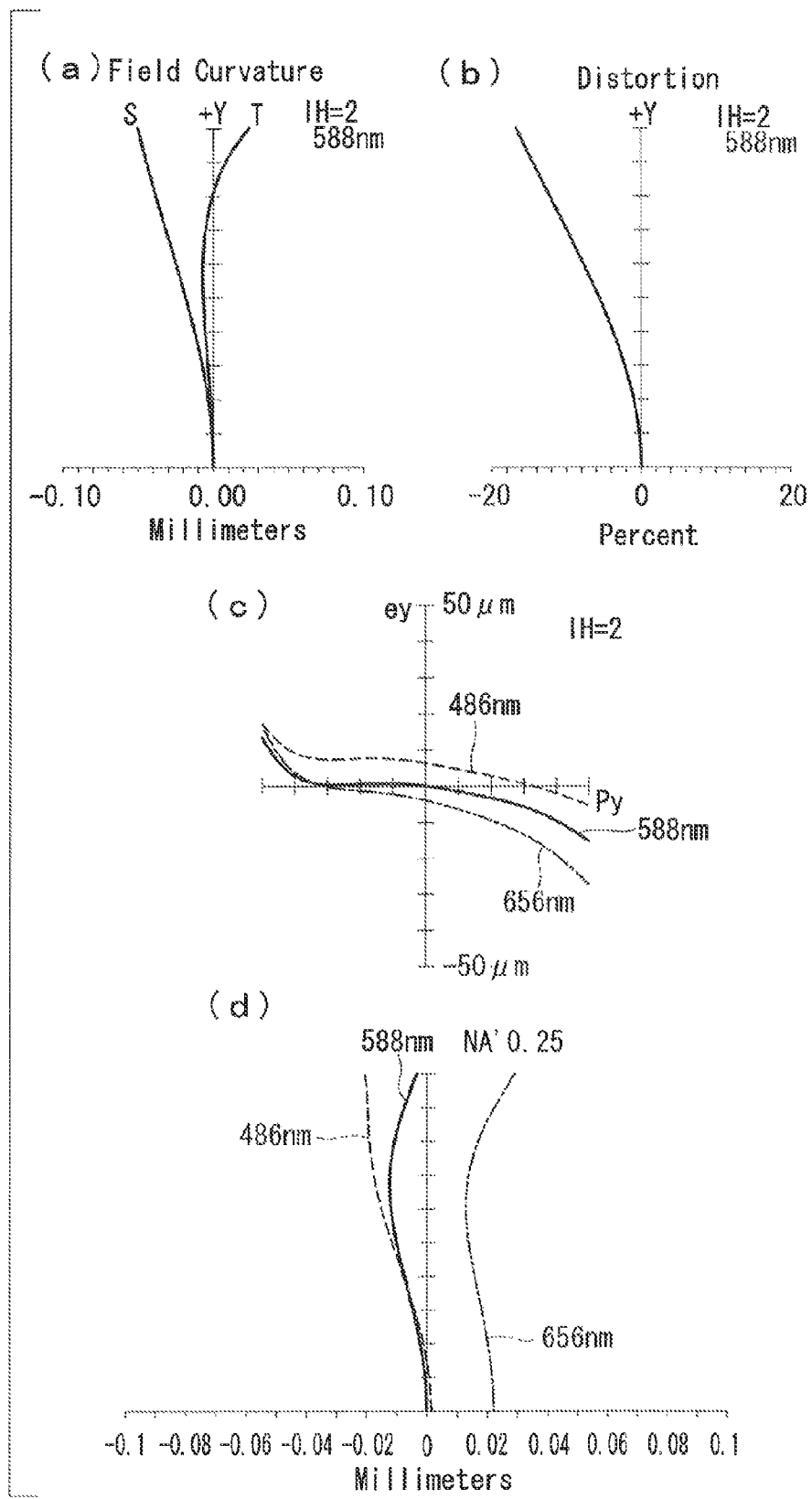
{FIG. 6}

FIG. 5 illustrates the lens layout of the microscope optical system 10 according to this example, Table 5 lists the lens data thereof, and FIG. 6 is an aberration diagram. In FIG. 5, only some surface numbers are illustrated, and the others are omitted.

FIG. 6(*a*) illustrates field curvature (astigmatic difference), FIG. 6(*b*) illustrates distortion, Fig. (c)C illustrates off-axis lateral aberration (comatic aberration and magnification chromatic aberration), and FIG. 6(*d*) illustrates spherical aberration. The aberrations are measured at the object surface by reverse tracing.

TABLE 5

| SURFACE NUMBER | CURVATURE RADIUS | SPACING | REFRACTURE INDEX | ABBE NUMBER |
|---|---|---|---|---|
| OBJECT SURFACE | ∞ | 0.17 (cover glass) | 1.521 | 56 |
| 1 | ∞ | 22.94 (WD) | | |
| (OBJECTIVE OPTICAL SYSTEM 2) | | | | |
| 2 | 55.54 | 3.44 | 1.4875 | 70.2 |
| 3 | −25.44 | 0.24 | | |
| 4 | 15.5 | 4.45 | 1.6779 | 55.3 |
| 5 | −52.78 | 1.63 | 1.5317 | 48.9 |
| 6 | 10.62 | 6.4 | | |
| 7 | −10.07 | 1.76 | 1.5955 | 39.2 |
| 8 | 112.02 | 5.21 | 1.497 | 81.5 |
| 9 | −21.01 | 0.72 | | |
| 10 | −53.0 | 2.7 | 1.4875 | 70.2 |
| 11 | −21.99 | 0.56 | | |
| 12 | −53.0 | 2.7 | 1.4875 | 70.2 |
| 13 | −21.99 | | | |
| (IMAGING OPTICAL SYSTEM 3) | | | | |
| 14 | 68.62 | 8.26 | 1.4875 | 70.2 |
| 15 | −37.4 | 3.44 | 1.8061 | 40.9 |
| 16 | −102.56 | 0.74 | | |
| 17 | 84.38 | 5.56 | 1.834 | 37.2 |
| 18 | −50.62 | 3.3 | 1.6445 | 40.8 |
| 19 | 40.65 | | | |
| (EYEPIECE OPTICAL SYSTEM 4) | | | | |
| 20 | −22.77 | 1.16 | 1.649 | 33.8 |
| 21 | 16.25 | 8.06 | 1.611 | 57.2 |
| 22 | −22.01 | 0.09 | | |
| 23 | 40.81 | 3.54 | 1.62 | 60.3 |
| 24 | −40.81 | 0.09 | | |
| 25 | 14.4 | 7.57 | 1.611 | 57.2 |
| 26 | −19.37 | 1.38 | 1.673 | 32.2 |
| 27 | 192.8 | | | |

Ko = 2
Fnob = 36
Ftl = 180
Fne = 12.5
FN = 20
ω = 39°
FN/2Fne = 0.8
M = 100

Third Example

Next, an example of the microscope optical system 20 according to the third embodiment of the present invention will be described below.

Figure 8:
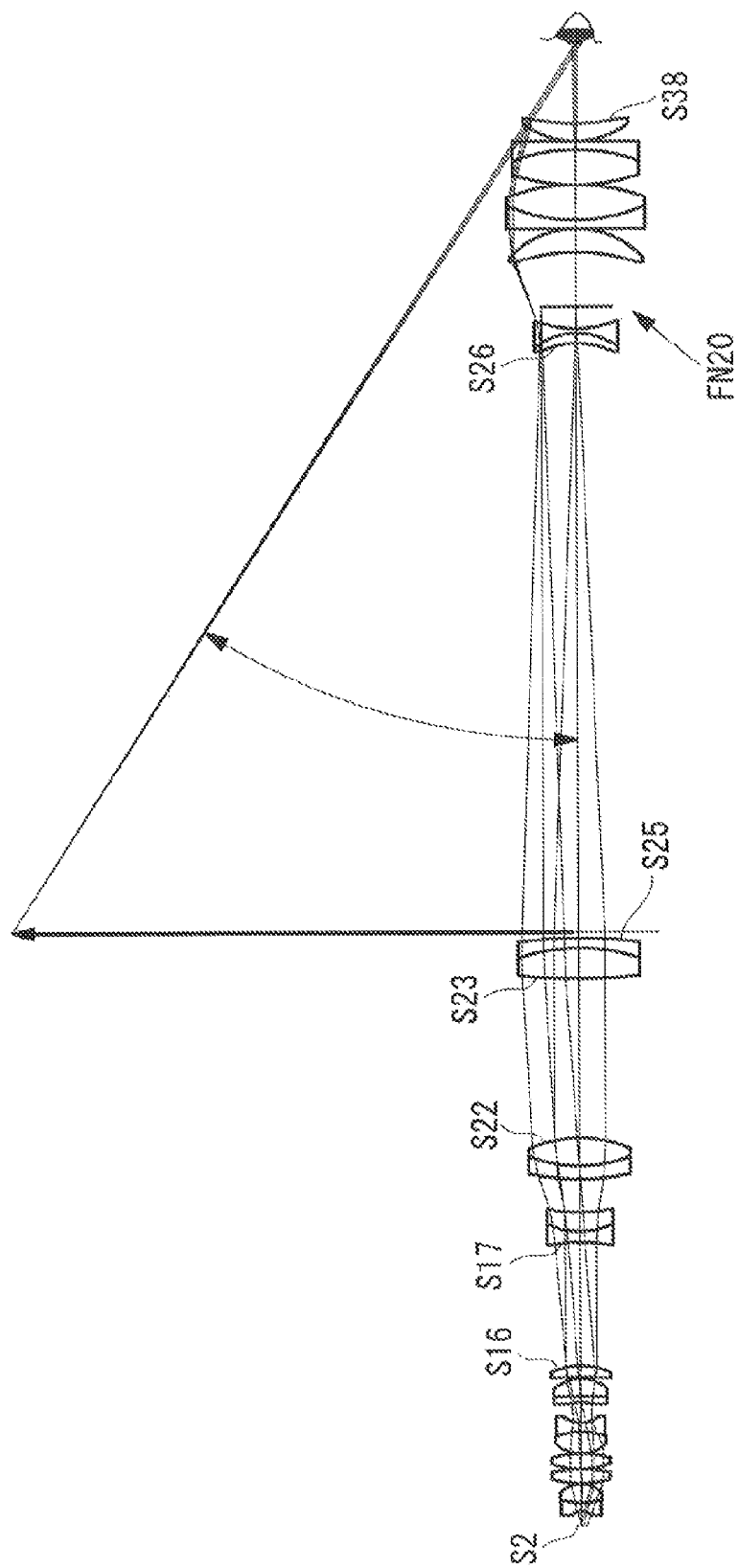
{FIG. 8}
Figure 9:
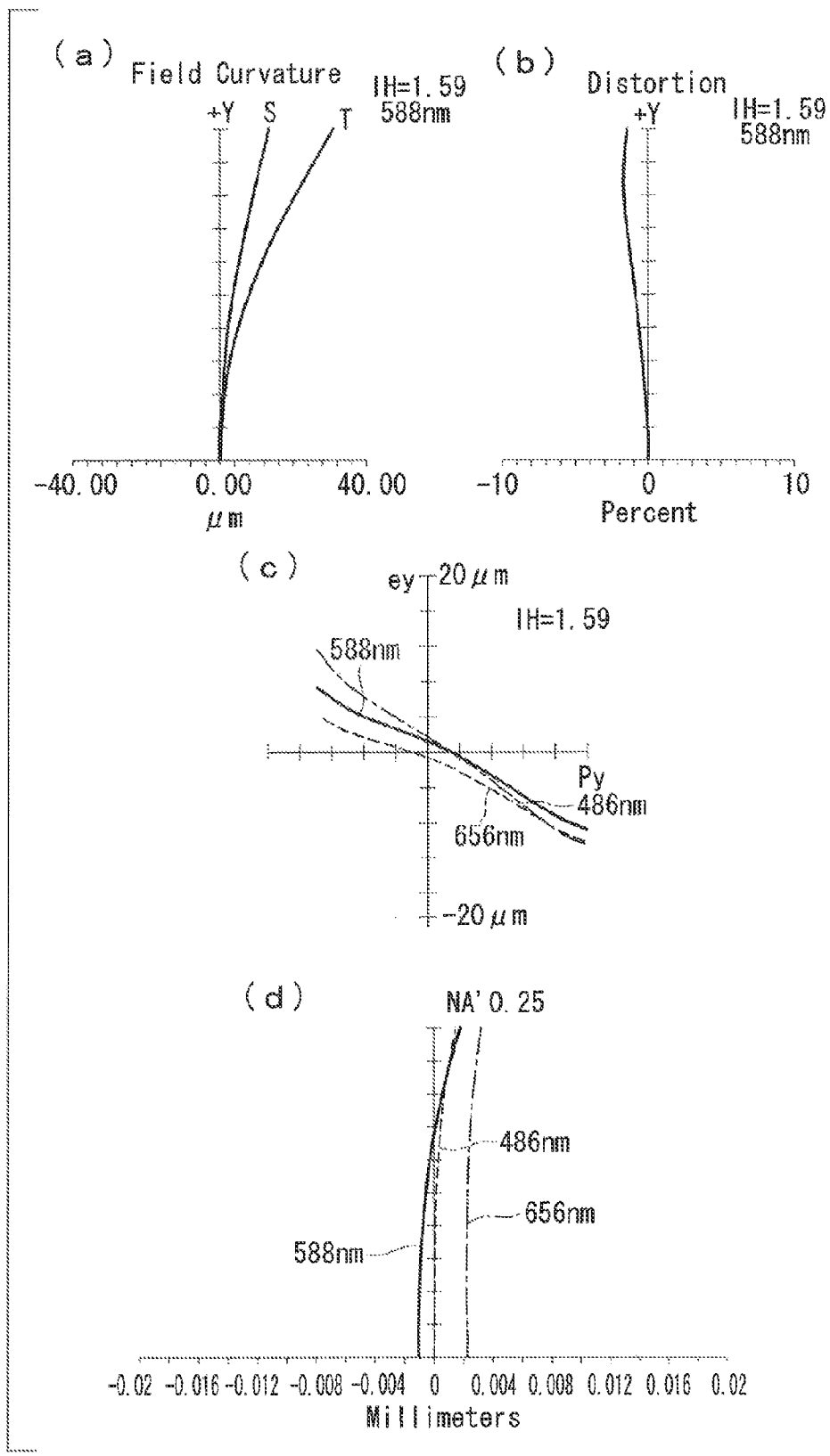
{FIG. 9}

FIG. 8 illustrates the lens arrangement of the microscope optical system 20 according to this example, Table 6 lists the lens data thereof, and FIG. 9 is an aberration diagram. In FIG. 8, only some surface numbers are illustrated, and the others are omitted.

FIG. 9(*a*) illustrates field curvature (astigmatic difference), FIG. 9(*b*) illustrates distortion, FIG. 9(*c*) illustrates off-axial lateral aberration (comatic aberration and magnification chromatic aberration), and FIG. 9(*d*) illustrates spherical aberration. The aberrations are measured at the object surface by reverse tracing.

TABLE 6

| SURFACE NUMBER | CURVATURE RADIUS | SPACING | REFRACTURE INDEX | ABBE NUMBER |
|---|---|---|---|---|
| OBJECT SURFACE | ∞ | 0.17 (cover glass) | 1.521 | 56 |
| 1 | ∞ | 3.58 (WD) | | |
| (OBJECTIVE OPTICAL SYSTEM 2) | | | | |
| 2 | −7.24 | 2.79 | 1.741 | 52.6 |
| 3 | 25.23 | 5.11 | 1.4388 | 94.9 |
| 4 | −8.38 | 0.37 | | |
| 5 | 25.68 | 4 | 1.4388 | 94.9 |
| 6 | −22.7 | 0.15 | | |
| 7 | 22.7 | 4 | 1.4388 | 94.9 |
| 8 | −25.68 | 0.24 | | |
| 9 | 10.72 | 5.93 | 1.4388 | 94.9 |
| 10 | −16.76 | 2.71 | 1.5268 | 51.1 |
| 11 | 7.54 | 5.98 | | |
| 12 | −6.44 | 1.44 | 1.6968 | 56.5 |
| 13 | 87.34 | 5.03 | 1.4388 | 94.9 |
| 14 | −10 | 0.15 | | |
| 15 | 167.84 | 3.43 | 1.5691 | 71.3 |
| 16 | −18.46 | | | |
| (INTERMEDIATE LENS SYSTEM) | | | | |
| 17 | −36.12 | 3 | 1.6779 | 55.3 |
| 18 | 21.09 | 5.5 | 1.74 | 28.3 |
| 19 | 41.04 | 9.5 | | |
| 20 | 67.67 | 3.5 | 1.738 | 32.3 |

TABLE 6-continued

| | | | | |
|---|---|---|---|---|
| 21 | 34.76 | 8 | 1.5952 | 67.7 |
| 22 | −36.65 | | | |
| (REFERENCE IMAGING OPTICAL SYSTEM 3') | | | | |
| 23 | 204.57 | 8 | 1.5691 | 71.3 |
| 24 | −56 | 3.12 | 1.7015 | 41.2 |
| 25 | −135.34 | | | |
| (EYEPIECE OPTICAL SYSTEM 4) | | | | |
| 26 | −28.1 | 2.88 | 1.8052 | 25.4 |
| 27 | −18.45 | 1.35 | 1.5163 | 64.1 |
| 28 | 28.1 | 21.61 | | |
| 29 | −55.06 | 6.3 | 1.755 | 52.3 |
| 30 | −27.45 | 0.36 | | |
| 31 | ∞ | 2.25 | 1.8052 | 25.4 |
| 32 | 45.9 | 9.9 | 1.7292 | 54.7 |
| 33 | −63 | 0.36 | | |
| 34 | 63 | 9.9 | 1.7292 | 54.7 |
| 35 | −45.9 | 2.25 | 1.8052 | 25.4 |
| 36 | ∞ | 0.36 | | |
| 37 | 27.45 | 4.5 | 1.755 | 52.3 |
| 38 | 55.06 | | | | q = 0.63
Fob = 18
Ftl = 180
Fne = 15.75
FN = 20
ω = 32.5°
M = 100
NA' = 0.25

REFERENCE SIGNS LIST

A specimen
B virtual image
C primary image C
E eye
ω half-angle field of view of the eyepiece optical system
1, 1', 10, 10', 20 microscope optical system
2 objective optical system
2' reference objective optical system
3 imaging optical system
3' reference imaging optical system
4 eyepiece optical system
4' reference eyepiece optical system
21 intermediate lens system
21a first group
21b second group

The invention claimed is:

1. A microscope optical system comprising:
an objective optical system configured to collect light from a specimen;
an imaging optical system configured to image the light coming from the specimen and collected by the objective optical system; and
an eyepiece optical system configured to magnify the image of the specimen formed by the imaging optical system and form a virtual image in an eye of an observer,
wherein the following conditional expressions are satisfied, $$M=(Fntl/Fob)\times 250/Fne \quad (1)$$

$$Fntl=Ftl\times Kt \quad (2)$$

$$Fne=Fe\times Kt \quad (3)$$

$$0.4<Kt<0.95 \quad (4)$$

where M is the total magnification, Fntl is the focal length of the imaging optical system, Fob is the focal length of the objective optical system, Fne is the focal length of the eyepiece optical system, Ftl is the focal length of the reference imaging optical system with no magnification, Fe is the focal length of the eyepiece optical system in the microscope optical system including the reference imaging optical system and the objective optical system, and Kt is a coefficient.

2. A microscope optical system comprising:
an objective optical system configured to collect light from a specimen;
an imaging optical system configured to image the light coming from the specimen and collected by the objective optical system; and
an eyepiece optical system configured to magnify the image of the specimen formed by the imaging optical system and form a virtual image in an eye of an observer,
wherein the following conditional expressions are satisfied, $$M=(Ftl/Fnob)\times 250/Fne \quad (5)$$

$$Fnob=Fob\times Ko \quad (6)$$

$$Fne=Fe/Ko \quad (7)$$

$$1.1<Ko<2.6 \quad (8)$$

where M is the total magnification, Ftl is the focal length of a reference imaging optical system with no magnification, Fnob is the focal length of the objective optical system, Fne is the focal length of the eyepiece optical system, Fob is the focal length of the objective optical system in the microscope optical system including the reference imaging optical system with no magnification and the reference eyepiece optical system with 10× magnification, Fe is the focal length of the reference eyepiece optical system, and Ko is a coefficient.

3. A microscope optical system comprising:
an objective optical system configured to collect light from a specimen;
an imaging optical system configured to image the light coming from the specimen and collected by the objective optical system; and
an eyepiece optical system configured to magnify the image of the specimen formed by the imaging optical system and form a virtual image in an eye of an observer,
wherein the following conditional expressions are satisfied, $$M=(Fntl/Fnob)\times 250/Fne \quad (9)$$

$$Fntl=Ftl\times Kt \quad (10)$$

$$Fnob=Fob\times Ko \quad (11)$$

$$Fne=Fe\times (Kt/Ko) \quad (12)$$

$$0.4<Kt<0.95 \quad (13)$$

$$1.1<Ko<2.6 \quad (14)$$

where M is the total magnification, Fntl is the focal length of the imaging optical system, Fnob is the focal length of the objective optical system, Fob is focal length of the objective optical system in the microscope optical system including the reference imaging optical system with no magnification, Fne is the focal length of the eyepiece optical system, Ftl is the focal length of the reference imaging optical system with no magnification, Fe is the focal length of the eyepiece optical system in the microscope optical system including the reference imaging optical system and the objective optical system, and Kt and Ko are coefficients.

4. The microscope optical system according to claim 1, wherein the following conditional expressions are satisfied:

$$10 < FN < 23 \tag{15}$$

$$0.65 < Kt < 0.85 \tag{16}$$

where FN represents the field number of the eyepiece optical system.

5. The microscope optical system according to claim 2, wherein the following conditional expressions are satisfied:

$$0.45 < FN/(2 \times Fne) < 1.4 \tag{17}$$

$$1.5 < Ko < 2.2 \tag{18}$$

where FN represents the field number of the eyepiece optical system.

6. A microscope optical system comprising:
   an objective optical system configured to collect light from a specimen;
   a reference imaging optical system with no magnification configured to converge the light coming from the specimen and collected by the objective optical system and form a primary image;
   an eyepiece optical system configured to magnify the primary image of the specimen formed by the reference imaging optical system and form a virtual image in an eye of an observer; and
   an intermediate lens system disposed between the objective optical system and the primary image and including, in order from the objective optical system side, a negative-power first group and a positive-power second group,
   wherein the following conditional expressions are satisfied, $$M = (Ftl/Fob) \times q \times 250/Fne \tag{19}$$

$$Fne = Fe \times q \tag{20}$$

$$0.55 < q < 0.95 \tag{21}$$

where M is the total magnification, Ftl is the focal length of the reference imaging optical system, Fne is the focal length of the eyepiece optical system, Fob is the focal length of the objective optical system in the microscope optical system including the reference imaging optical system and the reference eyepiece optical system with 10× magnification, Fe is the focal length of the reference eyepiece optical system, and q is a magnification conversion coefficient for a barrel magnification coefficient of the primary image formed by the intermediate lens system.

* * * * *